United States Patent Office 2,711,418
Patented June 21, 1955

2,711,418

MIXTURES OF 2-ETHYLHEXOXYSILOXANES

William S. Kather and Tibor Wiener, Redwood City, Calif., assignors, by mesne assignments, to Hodges Research & Development Company, New York, N. Y., a corporation of California No Drawing. Application January 6, 1950,
Serial No. 137,264

1 Claim. (Cl. 260—448.8)

This invention relates to neutral fully esterified complex mixtures of alkoxysiloxanes in which the linear compounds have the general molecular structure,

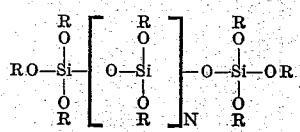

and in which branched and cyclic compounds are also present. It is more particularly concerned with such mixtures in which the radical R comprises an aliphatic group containing 5 to 14 carbon atoms.

These mixtures are generally characterized by being practically odorless, pale yellow to amber-colored liquids having high boiling points and low pour points. They are highly resistant to hydrolysis and possess remarkable oxidative stability in the presence of oxidation inhibitors.

Mixtures of neutral fully esterified alkoxysiloxanes may be prepared by a number of different methods. They may be made by the reaction of condensed ethyl silicate with an appropriate aliphatic alcohol or by the reaction of ethyl orthosilicate, water, and an aliphatic alcohol. Mixtures of alkoxysiloxanes have also been prepared from residues of orthosilicate pilot plant production which were heretofore discarded as being worthless.

The known alkyl orthosilicates are fluids which are generally characterized by having extremely wide liquid phase ranges, flat viscosity-temperature curves, and excellent thermal and hydrolytic stability. Such properties make them suitable as heat transfer media, hydraulic fluids, and light specialty lubricants. However, most of these liquids have limitations as general purpose lubricants because their viscosity is low, their volatility is comparatively great, and their oxidative stability is poor at high temperatures. Some of these limitations of the alkyl orthosilicates may be partially overcome by increasing the length of the carbon chain. However, when this is done, the pour point tends to increase until the fluids have limited utility, the viscosity index decreases rapidly, and the volatility and oxidative stability are only improved slightly. Furthermore, the alkyl orthosilicates having long carbon chains have limited commercial interests because the alcohols from which they must be made are quite expensive.

In contrast to the orthosilicates, alkoxysiloxanes do not possess the disadvantages enumerated above. These siloxanes may be prepared as individual compounds. Mixtures of alkoxysiloxanes may be prepared simply and inexpensively by a variety of different methods and possess the advantage of making distillation unnecessary. In many instances such mixtures possess the further advantage of having extremely low pour points in comparison with individual siloxanes of the same viscosity.

Mixtures of neutral fully esterified alkoxysiloxanes may be prepared by using condensed ethyl silicate as a starting material, and we prefer a mixture having the greatest degree of polymerization. The condensed ethyl silicate is preferably stripped of any residual orthosilicate by heating at reduced pressures. The stripped product is then added to a 5 to 50 per cent excess of the desired aliphatic alcohol. As the reaction proceeds, ethyl alcohol is evolved, and the resulting product is stripped of excess alcohol. An illustrative procedure which is described and claimed in the copending application of Tibor Wiener, owned by the common assignee of these applications, is as follows:

The silicon containing raw material was first prepared from "Ethyl Silicate 40," which is a commercial product of Carbide & Carbon Chemicals Corporation, a mixture of condensed ethyl silicates having a silica content ranging from 38 to 42 per cent by weight. This raw material is first prepared by removing the ethyl orthosilicate from the "Ethyl Silicate 40" by stripping in vacuum with the use of a column to facilitate separation of the components. The pot temperature was kept below 100° C. to avoid decomposition and approximately 20 per cent by volume of orthosilicate was removed. One part of stripped condensed ethyl silicate and 7 to 10 parts of "Mixed Decanols," a commercial product of the Carbide & Carbon Chemicals Corporation consisting of a mixture of 2-ethyl octanol and 2-butyl hexanol, were added to the reaction vessel. The pot temperature was raised to 150° C. and additional stripped condensed ethyl silicate was added at the rate at which ethanol was removed until the charge contained 1 part of stripped condensed ethyl silicate to 4 parts of alcohol. In theory, a volume ratio of reactants of approximately 3.2 to 1 is required so that the above charge provides approximately a 25 per cent excess of alcohol. The pot temperature was gradually raised to 280° C. and the reaction was completed in about 24 hours. The volume of ethanol recovered was 95 per cent of the stripped condensed ethyl silicate charge. Excess of the added alcohols were then stripped under vacuum. No orthosilicate was obtained when the temperature was raised to 250° C. The resulting product contained some solid residue which was removed by hot filtration with magnesium carbonate. The approximate yield based on stripped condensed ethyl silicate was 95 per cent.

The products resulting from this reaction are neutral fully esterified complex mixtures in which the linear polymers have the general structure,

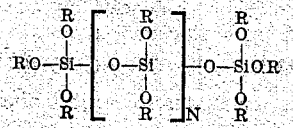

where N may range from 0 to 25 and R is an aliphatic radical. Products of this reaction also include various configurations of branched or cyclic polymers of which the following structure is illustrative:

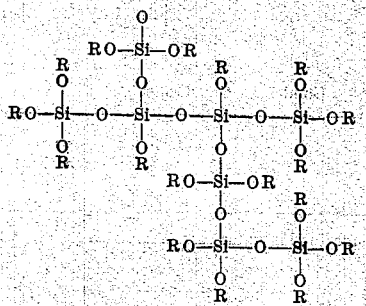

Where R is an aliphatic radical. Irrespective of the configuration these mixtures of alkoxysiloxanes have a ratio of alkoxy groups to silicon between the limits of 2:1 and 3:1.

In making these products we prefer to use branched or straight chain aliphatic alcohols ranging from 5 to 14 carbon atoms in length. When alcohols of less than 5 carbon atoms in length are used, products of inferior hydrolytic stability are obtained which make them unsuitable for many uses. In fact, condensed ethyl silicate is primarily used to deposit silica films.

The physical properties of several mixtures of alkoxysiloxanes, prepared as above, are presented below in tabular form where they are compared with their orthosilicate counterparts:

correspondingly less volatile than the orthosilicates. The pour points of these siloxanes are approximately the same as the corresponding orthosilicates, thus giving these siloxanes a considerably wider temperature range. The flatness of the viscosity-temperature curve of these mixtures is shown by the viscosity index (V. I.) and the viscosity-temperature coefficient (V. T. C.) in the table above. We believe the alkoxysiloxanes to be superior in these values to any known fluids of similar viscosity with the

*Physical properties*

| Alkyl Group | Species | Boiling Point, ° C. | Freezing or Pour Point, ° F. | Viscosity, centistokes | | V. I. | V. T. C. |
|---|---|---|---|---|---|---|---|
| | | | | 210° F. | 100° F. | | |
| n-Amyl | Orthosilicate | 157–162/3 mm | <−100 | 1.28 | 2.66 | | .52 |
| Do | Alkoxysiloxanes | >180/0.25 mm | <−100 | 9.78 | 28.1 | 183 | .65 |
| 2-Ethylbutyl | Orthosilicate | 145–149/0.3 mm | <−100 | 1.67 | 4.04 | | .59 |
| Do | Alkoxysiloxanes | >145/0.1 mm | <−85 | 15.6 | 55.8 | 164 | .72 |
| 1,3-Dimethylbutyl | Orthosilicate | 136–143/0.8–1.6 mm | <−100 | 1.56 | 3.92 | | .60 |
| Do | Alkoxysiloxanes | >160/0.1 mm | <−75 | 13.6 | 56.0 | 161 | .76 |
| 2-Ethylhexyl | Orthosilicate | 191–192/0.9 mm | <−100 | 2.36 | 6.83 | 175 | .65 |
| Do | Alkoxysiloxanes | >210/0.1 mm | <−95 | 13.1 | 48.5 | 166 | .73 |
| n-Decyl | Orthosilicate | 243–245/0.2 mm | 38 | 3.66 | 12.05 | 206 | .70 |
| "Decyl" | Alkoxysiloxanes | >230/0.1 mm | <−90 | 10.9 | 43.2 | 166 | .75 |
| n-Dodecyl | Orthosilicate | 288–292/0.5 mm | 65 | 4.9 | 18.5 | 190 | .73 |
| Do | Alkoxysiloxanes | >230/0.07 mm | 65 | 10.1 | 45.5 | 160 | .78 |
| "Tetradecyl" | Orthosilicate | 254–257/0.5 mm | −36 | 9.78 | 95.3 | 87 | .90 |
| Do | Alkoxysiloxanes | >220/0.1 mm | 10 | 97.3 | 1,350 | | .93 |

In preparing the mixture of n-amoxysiloxanes a more viscous product was desired. Since the boiling point of the disiloxane in this mixture is comparatively low, it was possible to strip substantially all of it to arrive at the product whose properties are presented in the preceding table.

The properties presented above are illustrative of those which may be obtained from practice of this invention, and the actual numerical values of such properties may be varied by altering the temperature and time of reaction. In addition to the reaction which consists of substituting a longer aliphatic radical for the original ethyl group in condensed ethyl silicate, some additional condensation may occur if high temperatures and long reaction periods are used.

The alcohols used in making these mixtures of alkoxysiloxanes, tabulated above, are, respectively, n-amyl alcohol; 2-ethylbutyl alcohol; methyl isobutyl carbinol; 2-ethylhexyl alcohol; "Mixed Decanols," a commercial product consisting of a mixture of branched chain 10-carbon atom alcohols, n-dodecyl or lauryl alcohol; and tetradecyl alcohol having the structural formula:

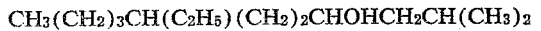

$CH_3(CH_2)_3CH(C_2H_5)(CH_2)_2CHOHCH_2CH(CH_3)_2$

In preparing the mixtures described above, various aliphatic alcohols were allowed to react with condensed ethyl silicates having a similar degree of condensation. The properties of mixed alkoxysiloxanes may also be varied by causing a particular alcohol to react with condensed ethyl silicates of varying degrees of condensation. Illustrative of the range which may be obtained using 2-ethylbutanol is the following:

| Condensed Ethyl Silicate | | Viscosity, centistokes, at 100° F. of mixed 2-ethylbutoxysiloxanes |
|---|---|---|
| Source | Viscosity, centistokes, at 100° F. | |
| Ethyl orthosilicate plus water | 4.3 | 26.6 |
| "Ethyl Silicate 40" stripped of orthosilicate | 7.5 | 55.8 |
| "Ethyl Silicate 40" stripped of disiloxane and trisiloxane | 45.2 | 495 |

The atmospheric boiling point of these products cannot be determined since decomposition of the compounds occurs at or below the boiling point. It may be observed from examination of the reduced pressure boiling points that these siloxanes have low vapor pressures and are exception of the alkyl siloxanes which can be made only by complicated and expensive methods.

The hydrolytic stability of these mixtures has been determined by a test in which the liquid is maintained in contact with boiling water. The excellent hydrolytic stability of one such mixture, a mixed decoxysiloxane, is demonstrated by the fact that no silica deposit was in evidence after a 10-day period of continuous heating.

The thermal stability of these mixtures was determined by heating them continuously in an open test tube at 450° F. The excellent thermal stability of one such mixture, a mixed decoxysiloxane, is evidenced by the fact that no carbon or other deposit was visible in the test tube after continuous heating for 12 days.

The low volatility and high oxidative stability of these mixtures in the presence of oxidation inhibitors, such as phenyl-alpha-naphthylamine (PAN), was determined by placing 70 cc. of mixture in a beaker maintained at 380° F. Severe oxidation of mixture was induced by obtaining violent mixing with air through the use of a stainless steel paddle rotating at 800 R. P. M. Results illustrative for certain of these mixtures and comparative fluids are presented below in tabular form:

*Volatility tests at 380° F.*

| | Inhibitor | Hours of Test | Percent Weight Loss |
|---|---|---|---|
| 2-Ethylhexyl orthosilicate | 1% PAN* | 10 | 50 |
| Mixed 2-ethylhexoxysiloxane | 1% PAN* | 25 | 15 |
| Polyalkyleneglycol, viscosity 36.5 centistokes at 100° F. | 1% PAN* | 10 | 53 |
| 2-Ethylhexyl sebacate | 1% PAN* | 20 | 49 |
| White oil, viscosity 22 centistokes at 100° F. | 1% PAN* | 9 | 46 |
| Petroleum oil, SAE 10 | Unknown, highly compounded. | 20 | 44 |
| Petroleum oil, SAE 30 | do | 19 | 25 |
| Mixed n-amoxysiloxane | 1% PAN* | 25 | 35 |
| Mixed decoxysiloxane | 1% PAN* | 35 | 23 |
| Mixed tetradecoxysiloxane | 1% PAN* | 55 | 19 |

*Phenyl-alpha-naphthylamine.

Examination of the first two examples in this table shows the greatly reduced weight loss of a mixed alkoxysiloxane in comparison with the corresponding orthosilicate even though the testing period of the former was considerably greater. The superiority of mixtures of alkoxysiloxanes over petroleum oils and other synthetic oils is also shown. Tests conducted at 450° F. and 500°

F. with phenyl-alpha-naphthylamine or with other inhibitors added to these alkoxysiloxanes and to some comparative fluids show the same trend.

In the test previously described, fluids responsive to oxidation inhibitors show a small percentage weight loss for extended periods of time followed by a rapid increase in weight loss after a critical time is exceeded. The time preceding the critical time interval, usually called the induction period, has been approximately determined in tests at 380° F. with mixed alkoxysiloxanes and a number of aromatic amine oxidation inhibitors such as phenyl-alpha-naphthylamine; phenyl-beta-naphthylamine; p-tert.-butylphenol; p-hydroxydiphenylamine; N,N'-diphenyl-p-phenylenediamine; p-isopropoxydiphenylamine; N,N'-di-beta-naphthyl-p-phenylenediamine; p-aminophenol; and diphenylamine. When each of these inhibitors was present in a concentration of 0.2 per cent with a mixed alkoxysiloxane, the induction period ranged from 1.0 to 7.5 hours. When the inhibitor was present in a concentration of 1.0 per cent, the induction periods ranged from 6.5 to over 55 hours.

In the same test procedure at 380° F. the low volatility and high oxidative stability of mixed alkoxysiloxanes were determined without the use of inhibitors and similar favorable results were obtained. As an example, the results of a test on 2-ethylhexoxysiloxanes as compared with the corresponding orthosilicate are shown below in tabular form.

*Volatility test at 380° F.*

|  | Hours of Test | Percent Weight Loss |
|---|---|---|
| 2-Ethylhexyl orthosilicate | 5 | 67 |
| Mixed 2-ethylhexoxysiloxanes | 5 | 33.5 |

A more accurate indication of induction period was also obtained in an oxidator equipment in which 25 cc. of test fluid are placed in a glass tube and agitated violently with a glass stirrer. Oxygen is stored above the fluid and, as it is gradually absorbed chemically into the liquid, the rate of oxygen absorption is measured on a recorder as a function of time. The following values of the induction period in hours were obtained for several alkoxysiloxanes and comparative fluids at 340° F. using .1 per cent of an oxidation inhibitor, phenyl-alpha-naphthylamine:

| Fluids | Induction Period in Hours |
|---|---|
| 2-Ethylhexyl orthosilicate | 2.4 |
| Mixed 2-ethylhexoxysiloxanes | 40 |
| Mixed decoxysiloxanes | 87 |
| Mixed tetradecoxysiloxanes | 65 |
| White oil, S.A.E 30 viscosity | 1.4 |
| 2-Ethylhexyl sebacate | 3.7 |

The measure of superiority of alkoxysiloxanes in comparison with other fluids possessing good oxidative stability is self-evident. A similar superiority was obtained at a variety of different temperatures ranging from 300 to 405° F. and with a variety of different inhibitors.

It is therefore apparent that the several alkoxysiloxanes and additives thereof, described above, are but illustrative of a family of these mixtures and to the many oxidation inhibitors which are appropriate for use therewith. Our invention is therefore not limited to these examples and reference should be had to the appended claim for a determination of the scope of our inventive contribution.

What is claimed is:

A composition of matter, a mixture of fully esterified 2-ethylhexoxysiloxanes containing 2-ethylhexoxy radicals only consisting essentially of siloxanes having from 2 to 25 siloxane units, with an alkoxy-group to silicon atom ratio between 2:1 and 3:1.

References Cited in the file of this patent

UNITED STATES PATENTS

| 2,375,007 | Larsen | May 1, 1945 |
| 2,389,802 | McGregor | Nov. 27, 1945 |
| 2,395,880 | Kirk | Mar. 5, 1946 |
| 2,404,426 | Bechtold | July 23, 1946 |
| 2,449,335 | Sowa | Sept. 14, 1948 |
| 2,490,691 | Langkammerer | Dec. 6, 1949 |
| 2,507,422 | Rust et al. | May 9, 1950 |